(12) United States Patent
Strzalka et al.

(10) Patent No.: US 11,981,437 B2
(45) Date of Patent: May 14, 2024

(54) VENTILATED ADJUSTABLE HEADREST

(71) Applicant: B/E Aerospace, Inc., Winston-Salem, NC (US)

(72) Inventors: Boguslaw Strzalka, Nysa (PL); Dariusz Sapija, Jelcz-Laskowice (PL)

(73) Assignee: B/E Aerospace, Inc., Winston-Salem, NC (US)

( * ) Notice: Subject to any disclaimer, the term of this patent is extended or adjusted under 35 U.S.C. 154(b) by 172 days.

(21) Appl. No.: 17/409,404

(22) Filed: Aug. 23, 2021

(65) Prior Publication Data
US 2022/0063813 A1 Mar. 3, 2022

(30) Foreign Application Priority Data
Sep. 2, 2020 (EP) .................................... 20194173

(51) Int. Cl.
*B64D 11/06* (2006.01)
*B60N 2/56* (2006.01)
*B60N 2/809* (2018.01)
*B60N 2/879* (2018.01)

(52) U.S. Cl.
CPC ........ *B64D 11/0626* (2014.12); *B60N 2/5642* (2013.01); *B60N 2/5657* (2013.01); *B60N 2/809* (2018.02); *B60N 2/879* (2018.02); *B64D 11/0642* (2014.12)

(58) Field of Classification Search
None
See application file for complete search history.

(56) References Cited

U.S. PATENT DOCUMENTS

| 5,085,487 | A | * | 2/1992 | Weingartner | ...... B64D 11/0647 297/DIG. 5 |
| 5,564,144 | A | * | 10/1996 | Weingartner | ............ B60N 2/70 297/452.53 |
| 6,189,966 | B1 | * | 2/2001 | Faust | .................... B60N 2/5635 297/180.13 |
| 6,247,751 | B1 | * | 6/2001 | Faust | .................... B60N 2/5635 297/180.13 |
| 6,305,749 | B1 | * | 10/2001 | O'Connor | .............. B60N 2/868 5/636 |
| 6,701,556 | B2 | * | 3/2004 | Romano | ............ A61G 7/05715 5/655.9 |

(Continued)

FOREIGN PATENT DOCUMENTS

| CN | 201777162 U | 3/2011 |
| CN | 207594766 U | 7/2018 |

(Continued)

OTHER PUBLICATIONS

Extended European Search Report dated Feb. 24, 2021 for EP Application No. 20194173.9.

*Primary Examiner* — David E Allred
(74) *Attorney, Agent, or Firm* — Suiter Swantz IP

(57) ABSTRACT

A ventilated adjustable headrest may include an adjustable metal insert, a nozzle fixedly attached to the adjustable metal insert. The nozzle may be in fluid communication with a perforated covering and one or more cushion elements. The nozzle may be telescopically coupled to one or more ventilation ducts. The one or more ventilation ducts may be configured to receive forced air from a ventilation system at an air inlet, and may be configured to deliver the forced air to the nozzle.

15 Claims, 4 Drawing Sheets

(56) References Cited

U.S. PATENT DOCUMENTS

| | | | |
|---|---|---|---|
| 7,506,924 B2* | 3/2009 | Bargheer | B60N 2/5621 |
| | | | 297/180.14 |
| 8,672,411 B2* | 3/2014 | Gomes | B60N 2/5635 |
| | | | 297/180.13 |
| 9,463,725 B2* | 10/2016 | Szczygiel | B60N 2/885 |
| 10,029,797 B2* | 7/2018 | Space | B64D 11/06 |
| 10,647,231 B2 | 5/2020 | Kearns et al. | |
| 10,889,378 B1* | 1/2021 | Wilson | B60N 2/5657 |
| 2001/0054837 A1* | 12/2001 | O'Connor | B60N 2/2872 |
| | | | 297/397 |
| 2002/0063451 A1 | 5/2002 | Bargheer et al. | |
| 2007/0188007 A1* | 8/2007 | Lazanja | B60N 2/5685 |
| | | | 297/452.42 |
| 2009/0154737 A1* | 6/2009 | Ostler | A47C 7/72 |
| | | | 381/301 |
| 2011/0101741 A1* | 5/2011 | Kolich | B60N 2/809 |
| | | | 297/180.12 |
| 2016/0023767 A1* | 1/2016 | Zheng | B60N 2/809 |
| | | | 297/391 |
| 2016/0047980 A1 | 2/2016 | Page et al. | |
| 2016/0122493 A1 | 5/2016 | Farris et al. | |
| 2016/0272327 A1* | 9/2016 | Baker | B64D 11/06 |
| 2017/0197529 A1* | 7/2017 | Hontz | B60N 2/885 |
| 2017/0291516 A1* | 10/2017 | Tat | B60N 2/806 |
| 2018/0257532 A1* | 9/2018 | Marquette | B60N 2/803 |
| 2018/0264718 A1 | 9/2018 | McCluskey | |
| 2018/0319302 A1* | 11/2018 | Novin | F16C 29/02 |
| 2019/0054847 A1 | 2/2019 | Lang et al. | |
| 2019/0092196 A1 | 3/2019 | Prozzi et al. | |
| 2019/0142172 A1 | 5/2019 | Toda et al. | |
| 2019/0160989 A1 | 5/2019 | Pardue et al. | |
| 2019/0359106 A1 | 11/2019 | Suzuki et al. | |
| 2020/0229530 A1* | 7/2020 | Feher | A42B 3/286 |
| 2020/0262565 A1* | 8/2020 | Wanner | B60N 2/885 |
| 2020/0282865 A1* | 9/2020 | Samain | B60N 2/233 |
| 2020/0369188 A1* | 11/2020 | Samain | B60N 2/806 |
| 2021/0345780 A1* | 11/2021 | Clough | B64D 11/0646 |
| 2023/0202369 A1* | 6/2023 | Kim | B60N 2/865 |
| | | | 297/391 |
| 2023/0234709 A1* | 7/2023 | Patel | B64D 11/0642 |
| | | | 297/284.9 |
| 2023/0249598 A1* | 8/2023 | Wickham | B60N 2/885 |
| | | | 297/391 |
| 2023/0294575 A1* | 9/2023 | Zhao | B60N 2/2851 |
| | | | 297/250.1 |
| 2023/0391241 A1* | 12/2023 | Millan | B60N 2/809 |

FOREIGN PATENT DOCUMENTS

| | | | | |
|---|---|---|---|---|
| CN | 211280745 | * | 8/2020 | |
| CN | 211280745 U | * | 8/2020 | |
| EP | 1203690 A3 | | 11/2003 | |
| EP | 2951063 B1 | | 10/2018 | |
| GB | 1437196 A | * | 5/1976 | A45D 20/44 |
| GB | 2580026 A | | 7/2020 | |
| JP | 2011031859 A | | 2/2011 | |
| JP | 2019201859 A | * | 11/2019 | B60H 1/00285 |
| KR | 20160139841 A | | 12/2016 | |
| NZ | 504686 A | | 8/2002 | |
| WO | WO-2009013445 A1 | * | 1/2009 | B60N 2/01 |

\* cited by examiner

VENTILATED ADJUSTABLE HEADREST

CROSS-REFERENCE TO RELATED APPLICATIONS

The present application claims the benefit of European Patent Application No. 20194173.9 titled VENTILATED ADJUSTABLE HEADREST, naming Boguslaw Strzalka and Dariusz Sapija as inventors, filed Sep. 2, 2020, which is incorporated herein by reference in the entirety.

JOINT UNDERTAKING

The project leading to this application has received funding from the Clean Sky 2 Joint Undertaking (JU) under grant agreement No. 83190. The JU receives support from the European Union's Horizon 2020 research and innovation program, and the Clean Sky 2 JU members other than the European Union.

BACKGROUND

Aircraft seats in passenger compartments within an aircraft cabin may include adjustable features to improve the comfort of the passenger. Some aircraft seats may include components that integrate air conditioning within each individual aircraft seat. Existing aircraft seats with individual air conditioning are unable to provide air conditioning to an adjustable headrest because a nozzle is unable to remain fluidically coupled to the headrest as it is adjusted. Additionally, integration of cabin air ventilation systems within aircraft seats frequently requires significant modifications to the aircraft seats and/or portions of the aircraft, including, without limitation, additional ducting (which may result in a corresponding increase in aircraft weight) and additional required maintenance (e.g., additional filters requiring replacement, or the like).

Therefore, it would be desirable to provide a system and method that cure one or more of the shortfalls of the previous approaches identified above.

SUMMARY

A ventilated adjustable headrest assembly is disclosed, in accordance with one or more embodiments of the disclosure. In one embodiment, the ventilated adjustable headrest may include an adjustable metal insert, wherein the metal insert includes two or more adjustable portions hingedly connected to a center portion. In another embodiment, the ventilated adjustable headrest assembly may include a nozzle fixedly attached to the adjustable metal insert, wherein the nozzle is in fluid communication with one or more ventilation ducts of a ventilation system. In another embodiment, the ventilated adjustable headrest assembly may include a perforated covering, wherein the covering includes a plurality of ventilation perforations on a front side of the perforated covering, and wherein the plurality of ventilation perforations is configured to permit the fluid transfer of forced air through the perforated covering. In another embodiment, the ventilated adjustable headrest includes one or more cushion elements in fluid communication with the perforated covering.

A ventilated aircraft seat is disclosed, in accordance with one or more embodiments of the disclosure. In some embodiments, the ventilated aircraft seat may include a seat pan. In another embodiment, the ventilated aircraft seat may include a backrest portion. In another embodiment, the ventilated aircraft seat may include a ventilated adjustable headrest. In another embodiment, the ventilated adjustable headrest may include an adjustable metal insert, wherein the metal insert includes two or more adjustable portions hingedly connected to a center portion. In another embodiment, the ventilated adjustable headrest assembly may include a nozzle fixedly attached to the adjustable metal insert, wherein the nozzle is in fluid communication with one or more ventilation ducts of a ventilation system. In another embodiment, the ventilated adjustable headrest assembly may include a perforated covering, wherein the covering includes a plurality of ventilation perforations on a front side of the perforated covering, and wherein the plurality of ventilation perforations is configured to permit the fluid transfer of forced air through the perforated covering. In another embodiment, the ventilated adjustable headrest includes one or more cushion elements in fluid communication with the covering.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures, in which.

DETAILED DESCRIPTION OF THE INVENTION

Figure 1A:
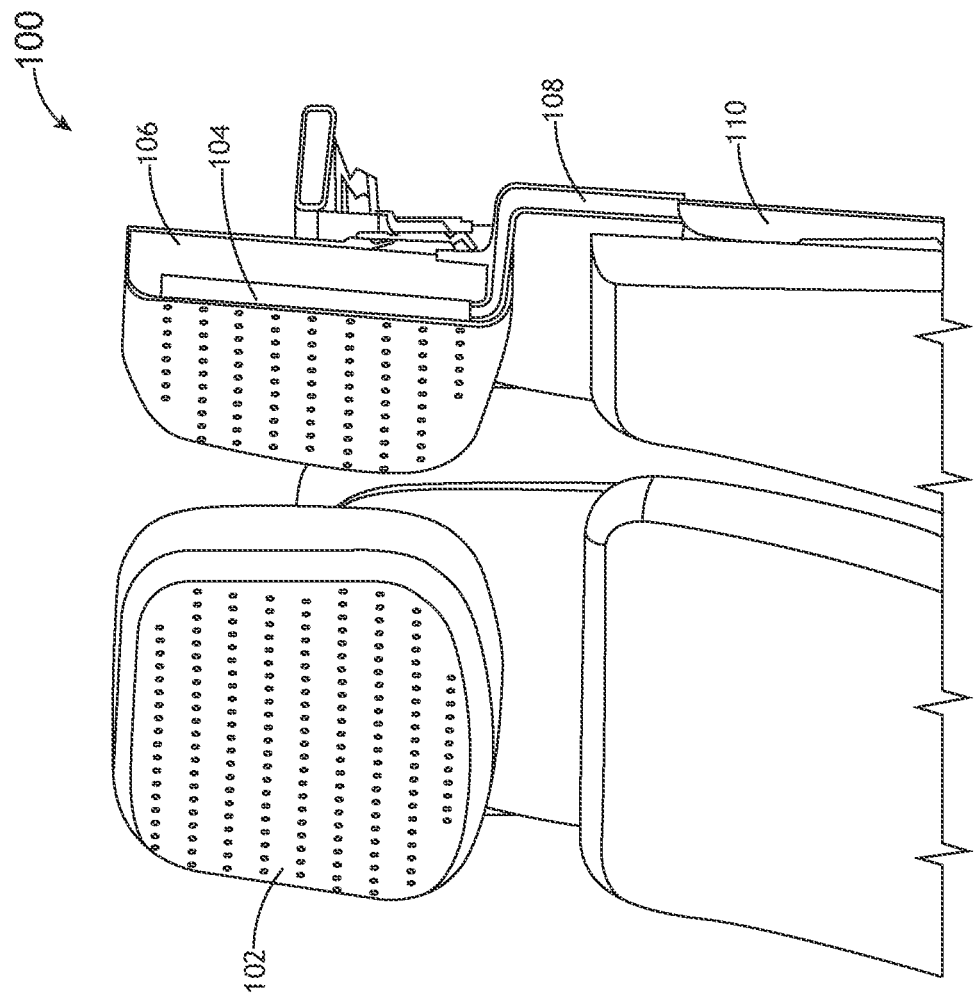
FIG. 1A illustrates a cross-sectional perspective view of a ventilated adjustable headrest, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Aircraft seats in passenger compartments within an aircraft cabin may include adjustable features to improve the comfort of the passenger. Some aircraft seats may include components that integrate air conditioning within each individual aircraft seat. Existing aircraft seats with individual air conditioning are unable to provide air conditioning to an adjustable headrest because a nozzle is unable to remain fluidically coupled to the headrest as it moves. Also, integrating cabin air ventilation systems within aircraft seats requires significant modifications including, but not limited to, additional ducting (which may result in a corresponding increase in aircraft weight) and additional required maintenance (e.g., additional filters requiring replacement and the like).

As such, it would be beneficial to provide a ventilated adjustable headrest. The ventilated adjustable headrest may provide individual air conditioning for an adjustable headrest. The ventilated adjustable headrest may supplement components in an existing ventilated aircraft seat system and may be implemented without considerable reconfiguration to the existing ventilated aircraft seat system. Also, the ventilated adjustable headrest does not require a considerable increase in aircraft cabin installation weight, or a considerable increase in required maintenance.

Figure 1B:
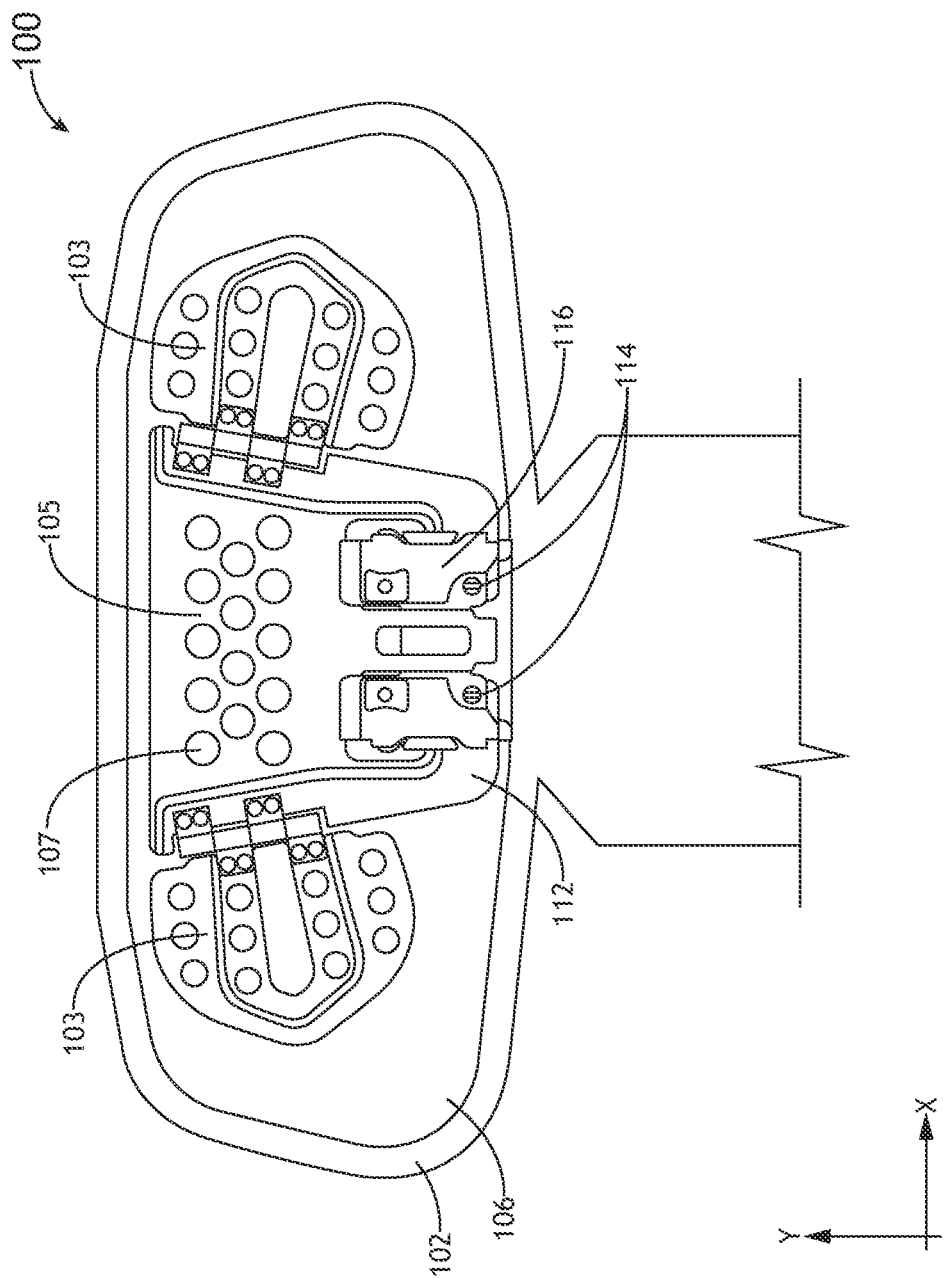
FIG. 1B illustrates a back cross-sectional view of a ventilated adjustable headrest, in accordance with one or more embodiments of the disclosure.
Figures 1C, 1D:
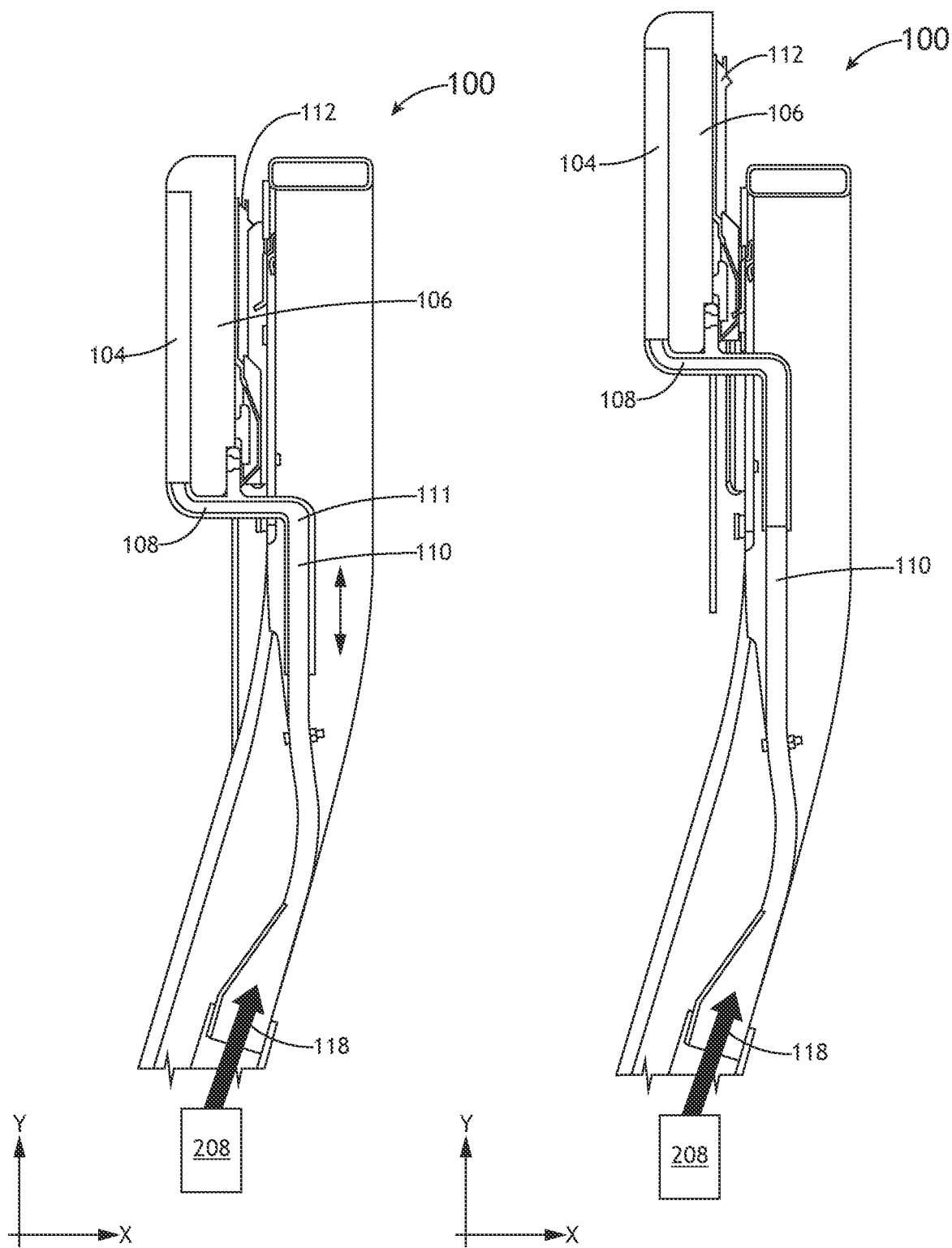
FIG. 1C illustrates a side cross-sectional view of a ventilated adjustable headrest, in accordance with one or more embodiments of the disclosure.
FIG. 1D illustrates a side cross-sectional view of a ventilated adjustable headrest, in accordance with one or more embodiments of the disclosure.
Figure 2:
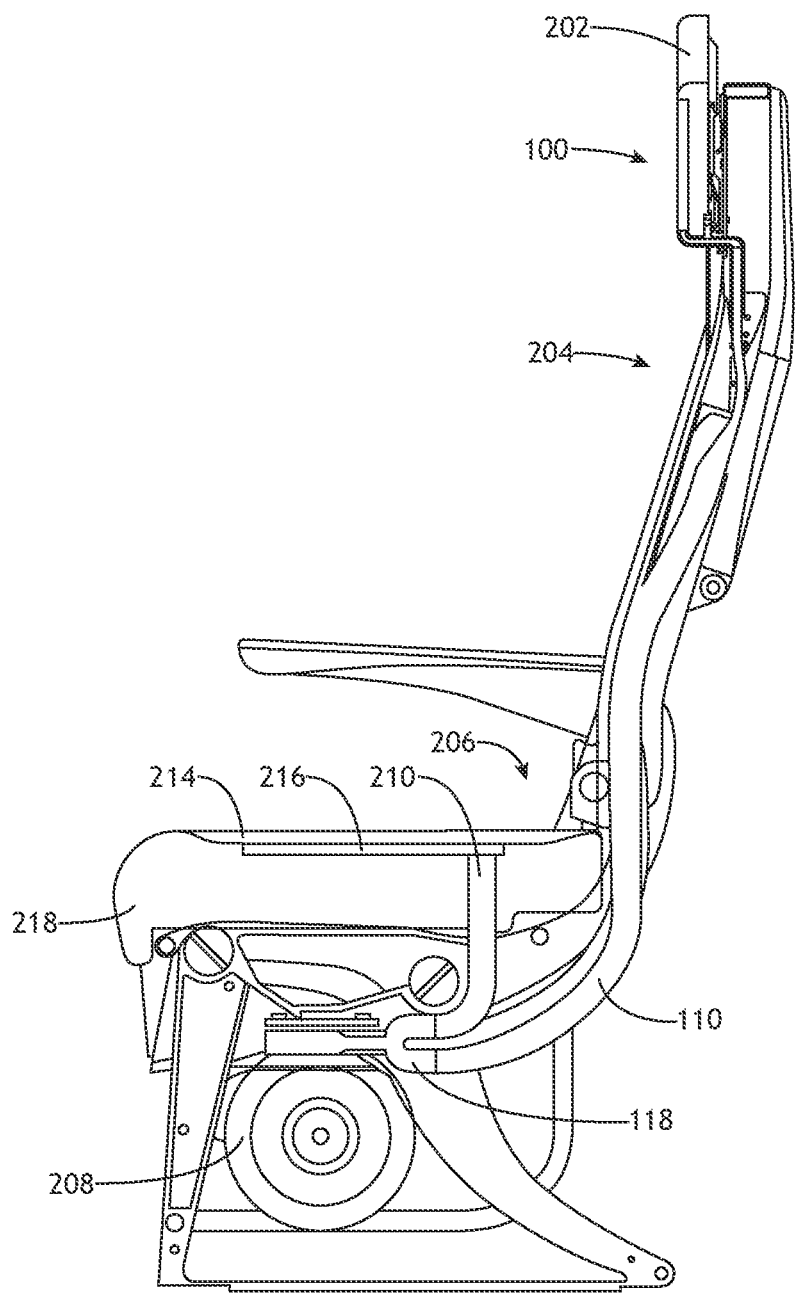
FIG. 2 illustrates a side cross-sectional view of an aircraft seat including a ventilated adjustable headrest, in accordance with one or more embodiments of the disclosure.

Referring generally to FIGS. 1A-2, a ventilated adjustable headrest is disclosed, in accordance with one or more embodiments of the present disclosure.

FIG. 1A is a cross-sectional perspective view of a ventilated adjustable headrest 100, in accordance with one or more embodiments of the present disclosure. The ventilated adjustable headrest 100 may be configured for attachment to an existing aircraft seat. For example, the ventilated adjustable headrest 100 may be configured to be couplable to one or more portions of the existing aircraft seat using any attachment means known in the art, including, without limitation, screws.

The ventilated adjustable headrest 100 may include a perforated covering 102, one or more mesh pads 104, one or more cushions 106, a nozzle 108, and one or more ventilation ducts 110. The perforated covering 102 may be configured to enclose one or more cushion elements, including, without limitation, the one or more mesh pads 104 and the one or more cushions 106. The one or more mesh pads 104 may be configured to allow an amount of forced air to flow through the mesh pad 104 and the perforated covering 102. In this regard, the one or more mesh pads 104 and the one or more cushions 106 may be in fluid communication with each of the nozzle 108 and the perforated covering 102. The perforated covering 102 may include a plurality of ventilation perforations configured to allow for the fluid transfer of air from the nozzle 108 to one or more portions of an aircraft cabin surrounding the ventilated adjustable headrest 100. For example, the perforated covering 102 may be configured to allow for the fluid transfer of air to an area surrounding the head of a passenger seated in an aircraft seat.

FIG. 1B illustrates a back cross-sectional view of a ventilated adjustable headrest 100, in accordance with one or more embodiments of the disclosure. The ventilated adjustable headrest 100 may include an adjustable metal insert 112. The adjustable metal insert 112 may include two or more adjustable portions 103 hingedly coupled to a center portion 105. For example, the two or more adjustable portions 103 may be configured to be independently adjustable by an occupant of the aircraft seat. By way of another example, the two or more adjustable portions 103 may be configured to be adjustable about a y-axis, wherein the one or more adjustable portions 103 are hingedly coupled to the center portion along the y-axis.

The adjustable metal insert 112 may be configured to be coupled to one or more of the perforated covering 102, the one or more mesh pads 104, or the one or more cushions 106. For example, the adjustable metal insert 112 may be inserted into one or more cavities formed within the one or more mesh pads 104 and/or the one or more cushions 106. By way of another example, the adjustable metal insert 112 may include one or more means for attachment to the one or more mesh pads 104, the one or more cushions 106, and/or the perforated covering 102. In at least the foregoing embodiment, the one or more means for attachment may include, but are not limited to, any attachment means known in the art, including adhesive attachment compounds and mechanical fasteners (e.g., staples, tacks, hook and loop, and the like).

The adjustable metal insert 112 may include a plurality of holes 107 configured to permit the fluid transfer of air through the adjustable metal insert 112. In this regard, the adjustable metal insert 112 may be configured to permit the fluid transfer of air through the adjustable metal insert 112. In some embodiments, the plurality of holes 107 may be configured to reduce the mass of the adjustable metal insert 112. The adjustable metal insert 112 may include one or more fastening means 116 configured to securely couple the adjustable metal insert 112 to one or more portions of the aircraft seat. For example, the one or more fastening means 116 may include one or more plates coupled to both the aircraft seat and one or more portions of the adjustable metal insert 112. By way of another example, the one or more fastening means 116 may include one or more fasteners 114 (e.g., screw, nut, bolt, or the like). The one or more fastening means 116 may be configured for use with one or more fasteners 114 to be used. The one or more fastening means 116 may be configured to permit the ventilated adjustable headrest 100 to be easily retrofitted onto existing aircraft seats. For example, the one or more fastening means 116 may be configured to minimize the amount of labor, retooling, reconfiguration, or modification required for installation of the ventilated adjustable headrest 100 onto an existing aircraft seat. In this regard, the one or more fastening means 116 (and/or the ventilated adjustable headrest 100) may be configured to be coupled to one or more portions of an existing aircraft seat via hardware and/or features already present on the existing aircraft seat.

While the adjustable metal insert 112 is described herein as a component formed from metal, it is specifically contemplated that the embodiments of the present disclosure are not to be considered as limiting. For example, the adjustable metal insert may be formed from any material known in the art to be suitable for the purposes contemplated by the present disclosure, including, without limitation, metal, polymer, and the like.

FIGS. 1C and 1D illustrate side cross-sectional views of a ventilated adjustable headrest 100, in accordance with one or more embodiments of the present disclosure.

The nozzle 108 may be in fluid communication with each of the one or more ventilation ducts 110, the one or more mesh pads 104, and the one or more cushions 106. For example, the nozzle 108 may be configured to deliver air to the one or more cushions 106 and/or the one or more mesh pads 104 such that the air may be fluidically passed through the perforated covering 102. In some embodiments, the one or more ventilation ducts 110 may be configured to receive air from one or more ventilation systems 208. The one or more ventilation systems 208 may be configured to propel the air such that it is distributed along a length of the one or more ventilation ducts 110 to the nozzle 108. The one or more ventilation ducts 110 may be configured to be fluidically coupled to the nozzle 108 at an upper end 111 and to the one or more ventilation systems 208 at an air inlet 118.

The ventilated adjustable headrest 100 may be configured for slidable adjustment along an adjustment axis (e.g., along a y-axis). For example, the nozzle 108 may be configured such that it may be telescopically coupled to the one or more ventilation ducts 110. In this regard, the ventilated adjustable headrest 100 may be slidably adjusted along the adjustment axis while maintaining a fluid coupling to the one or more ventilation ducts 110. FIG. 1C shows the ventilated adjustable headrest 100 configured in a "down" position. In order to facilitate the slidable adjustment, the adjustable metal insert 112 may include one or more slidable adjustment means. For example, the adjustable metal insert 112 may include one or more tracks, wherein the one or more tracks include two or more track portions. By way of another example, at least one of the two or more track portions may be fixedly coupled to the adjustable metal insert 112. In at least the foregoing embodiment, at least another of the two or more track portions may be fixedly coupled to one or more portions of the aircraft seat such that the two or more track portions may be slidably coupled to each other. In this regard, the one or more slidable adjustment means of the adjustable metal insert 112 may be configured to provide stability to the ventilated adjustable headrest 100 when the ventilated adjustable headrest is slidably adjusted.

FIG. 1D shows the ventilated adjustable headrest 100 configured in an "up" position. The one or more ventilation ducts 110 and/or the nozzle 108 may include one or more elements configured to prevent the slidable adjustment of the ventilated adjustable headrest 100. For example, the one or more ventilation ducts and/or the nozzle 108 may include one or more stop devices configured to block the movement of the adjustment of the ventilated adjustable headrest along at least one direction of the adjustment axis when the ventilated adjustable headrest 100 has reached a certain point along the adjustment axis (e.g., when it has reached a maximum intended height). In another embodiment, the slidable adjustment means of the adjustable metal insert 112 may include one or more elements configured to prevent the slidable adjustment of the ventilated adjustable headrest 100.

The nozzle 108 may be formed from any material known in the art to be suitable for the purposes contemplated by the present disclosure. For example, the nozzle 108 may be formed from metal and/or one or more polymers. The nozzle 108 may be fabricated via three-dimensional (3D) printing. The nozzle 108 may be configured such that it may be easily installed on an existing aircraft seat.

The one or more ventilation ducts 110 may be formed from metal and/or one or more polymers. The one or more ventilation ducts 110 may be fabricated via three-dimensional (3D) printing. The one or more ventilation ducts 110 may be configured such that they may be easily installed on an existing aircraft seat.

FIG. 2 illustrates a side cross-sectional view of an aircraft seat 200 including a ventilated adjustable headrest, in accordance with one or more embodiments of the disclosure. The aircraft seat 200 may include a seat pan 206, an upper back section 204, and a ventilation system 208.

The seat pan 206 may include padding housed within one or more seat materials. The one or more seat materials may comprise any material known in the art to be suitable for the purposes contemplated by the present disclosure, including, without limitation, leather, polymeric fiber, fabric or the like. The padding may be supported on a metallic frame fixedly coupled to one or more portions of an aircraft cabin. In some embodiments, the seat pan 206 may include springs configured to provide passenger comfort and/or to absorb shock impulse. The padding may be formed from any material known in the art to be suitable for the purposes contemplated by the present disclosure, including, without limitation, foam.

The seat pan 206 may be configured to house one or more portions of the one or more ventilation ducts 110. For example, the seat pan 206 and/or the padding of the seat pan 206 may be formed to include one or more cavities in which one or more portions of the ventilation ducts 110 may be disposed.

The upper back section 204 may include padding housed within one or more seat materials. The one or more seat materials may comprise any material known in the art to be suitable for the purposes contemplated by the present disclosure, including, without limitation, leather, polymeric fiber, fabric or the like. The padding may be supported on a metallic frame fixedly coupled to one or more portions of an aircraft cabin. In some embodiments, the upper back section 204 may include springs configured to provide passenger comfort and/or to absorb shock impulse. The padding may be formed from any material known in the art to be suitable for the purposes contemplated by the present disclosure, including, without limitation, foam.

The ventilation system 208 may be configured to be disposed on one or more portions of the aircraft seat 200. For example, the ventilation system 208 may be fixedly coupled to a bottom face of the seat pan 206. The ventilation system 208 may include any ventilation system known in the art to be suitable for the purposes contemplated by the present disclosure. For example, the ventilation system 208 may include one or more HVAC systems.

The ventilation system 208 may be fluidically coupled to one or more heating or cooling components. For example, the ventilation system 208 may be fluidically coupled to one or more condensers and/or one or more heaters. The one or more heating or cooling components may include any heating or cooling element known in the art to be suitable for increasing and/or decreasing the temperature of an air output. The one or more heating or cooling components may be configured to increase and/or decrease the temperature of the air output in response to a user input (e.g., via a user interface communicatively coupled to a controller) or a as a pre-determined adjustment following a sensed change in the environment surrounding the aircraft seat (e.g., the change being sensed by one or more sensors proximate to the aircraft seat, within the aircraft seat, within components integrated within or communicatively coupled to the aircraft seat, or the like). The ventilation system 208 may include one or more air purification systems configured to purify an air input. The ventilation system 208 may be configured to receive air from within an aircraft and from without the aircraft. For example, the ventilation system 208 may be configured to receive air from outside of a cabin of the aircraft (e.g., engine bleed). By way of another example, the ventilation system 208 may be configured to receive air from an electric air compression system configured to compress and store air received from outside of the aircraft cabin. The ventilation system 208 may be configured to mix air from within the aircraft cabin with air received from outside of the aircraft cabin.

The ventilation system 208 may include a ventilation system control module. The ventilation system control module may comprise a controller, and may include one or more processors configured to execute a programmable set of instructions, wherein the programmable set of instructions may be configured to control one or more aspects of the ventilation system 208 (e.g., power settings of the ventilation system 208, air temperature, airflow, and the like). For example, the ventilation system control module may be configured to control the one or more heating or cooling components. In this regard, the ventilation system control module may be configured to transmit one or more control signals to the one or more heating or cooling components.

The ventilation system 208 may be configured to force an air output through one or more other components of the ventilated adjustable headrest 100. For example, the ventilation system 208 may force an air output to the one or more ventilation ducts 110 at the air inlet 118. In this regard, the ventilation system 208 may be fluidically coupled to each of the one or more ventilation ducts 110, the nozzle 108, the one or more mesh pads 104, the one or more cushions 106. The air output may include a laminar fluid, wherein air is forced from the ventilation system 208 at a velocity sufficiently low to ensure that the fluid transfer of the air is laminar in nature.

It is specifically noted that the embodiments of the present disclosure are not limited to ventilating a headrest portion of an aircraft seat. For example, the aircraft seat 200 may include one or more additional ventilated portions, including, without limitation, a ventilated seat pan. In this regard, the seat pan 206 may include a seat pan perforated covering 214, one or more seat pan mesh pads 216, and one or more seat pan cushions 218. The seat pan 206 may include one or more portions of the one or more ventilation ducts 110. For example, the seat pan 206 may include a seat pan ventilation duct 210, wherein the seat pan ventilation duct 210 is fluidically coupled to the ventilation system 208 at the air inlet 118.

The seat pan perforated covering 214 may be configured to enclose the one or more seat pan mesh pads 216 and the one or more seat pan cushions 218. The one or more seat pan mesh pads 216 may be configured to allow an amount of forced air to flow through the one or more seat pan mesh pads 216 and the seat pan perforated covering 214. In this regard, the one or more seat pan mesh pads 216 and the one or more seat pan cushions 218 may be in fluid communication with each of the seat pan ventilation duct 210 and the seat pan perforated covering 214. The seat pan perforated covering 214 may include a plurality of ventilation perforations configured to allow for the fluid transfer of forced air from the ventilation system 208 to one or more portions of an aircraft cabin surrounding the seat pan 206. For example, the perforated covering 102 may be configured to allow for the fluid transfer of air to an area surrounding the waist of a passenger seated in an aircraft seat.

It is specifically noted that the embodiments of the present disclosure may be configured to supplement components in an existing cabin air ventilation system, and may be implemented without considerable reconfiguration to the existing cabin air ventilation system. It is further noted that the embodiments of the present disclosure may be configured such that their implementation does not result in certain undesirable performance outcomes, including, without limitation, a considerable increase in aircraft weight, or a considerable increase in required maintenance.

It is noted herein the embodiments of the present disclosure may be configured in accordance with aviation guidelines and/or standards put forth by, without limitation, the Federal Aviation Administration (FAA), the European Aviation Safety Agency (EASA), or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an aviation environment, it is noted herein the ventilated adjustable headrest and/or components of the ventilated adjustable headrest is not limited to the aviation environment and/or the aircraft components within the aviation environment. For example, the ventilated adjustable headrest and/or components of the ventilated adjustable headrest may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include, but is not limited to, an automobile, a bus, a truck, a recreational vehicle (RV), a trailer, or the like. By way of another example, the ventilated adjustable headrest and/or components of the ventilated adjustable headrest may be coupled to and/or configured to operate with an apparatus sold for commercial or industrial use in either a home or a business. Therefore, the above description should not be interpreted as a limitation on the present disclosure but merely an illustration.

It is noted that a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Although embodiments of the disclosure are directed to an aviation environment, it is noted herein the ventilated adjustable headrest and/or components of the ventilated adjustable headrest is not limited to the aviation environment and/or the aircraft components within the aviation environment. For example, the ventilated adjustable headrest and/or components of the ventilated adjustable headrest may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include, but is not limited to, an automobile, a bus, a truck, a recreational vehicle (RV), a trailer, or the like. By way of another example, the ventilated adjustable headrest and/or components of the ventilated adjustable headrest may be coupled to and/or configured to operate with an apparatus sold for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A ventilated adjustable headrest, comprising:
   an adjustable insert, wherein the adjustable insert comprises two or more adjustable portions hingedly connected to a center portion;
   a nozzle fixedly attached to the adjustable insert, wherein the nozzle is in fluid communication with one or more ventilation ducts of a ventilation system by which the nozzle is configured to receive forced air;
   a mesh pad, wherein the nozzle is configured to deliver the forced air to the mesh pad;
   a cushion;
   a perforated covering comprising a front side abutting a forward-facing surface of the mesh pad and a rear side abutting a rear-facing surface of the cushion, the perforated covering enclosing the mesh pad and the cushion, wherein the mesh pad is configured to allow the forced air to flow through the mesh pad to the perforated covering, wherein the perforated covering comprises a plurality of perforations through the front side of the perforated covering, wherein the plurality of perforations are configured to permit a fluid transfer of the forced air through the front side of the perforated covering, wherein the adjustable insert is coupled to the rear side of the perforated covering, wherein the two or more adjustable portions and the center portion each comprise a plurality of holes configured to permit fluid transfer of the forced air through the adjustable insert; wherein the nozzle is configured to first deliver the forced air at a bottom edge of the mesh pad; and wherein the cushion abuts the mesh pad and the rear side of the perforated covering.

2. The ventilated adjustable headrest of claim 1, wherein the nozzle is formed via three-dimensional (3D) printing.

3. The ventilated adjustable headrest of claim 1, wherein the nozzle is telescopically coupled to the one or more ventilation ducts of the ventilation system by which the nozzle is configured to receive the forced air.

4. The ventilated adjustable headrest of claim 1, wherein the one or more ventilation ducts of the ventilation system are fixedly attached to a structure of an aircraft seat.

5. The ventilated adjustable headrest of claim 3, wherein the one or more ventilation ducts of the ventilation system are configured to transfer forced air from the ventilation system to the nozzle.

6. The ventilated adjustable headrest of claim 5, wherein the ventilation system comprises a ventilation system control module.

7. The ventilated adjustable headrest of claim 3, wherein the ventilated adjustable headrest is configured to be telescopically adjustable along an adjustment axis.

8. The ventilated adjustable headrest of claim 1, wherein the covering is formed from at least one of a leather material, a polymeric material, or a fabric material.

9. An aircraft seat, comprising:
   a seat pan including a bottom face;
   a backrest portion; and
   a ventilation system coupled to the bottom face of the seat pan, the ventilation system including one or more ventilation ducts and an air inlet coupled to the one or more ventilation ducts by which the ventilation system is configured to transfer forced air through the one or more ventilation ducts;
   a ventilated adjustable headrest, the ventilated adjustable headrest comprising:
      an adjustable insert, wherein the adjustable insert comprises two or more adjustable portions hingedly connected to a center portion;
      a nozzle fixedly attached to the adjustable insert, wherein the nozzle is in fluid communication with the one or more ventilation ducts of the ventilation system by which the nozzle is configured to receive the forced air;
      a mesh pad, wherein the nozzle is configured to deliver the forced air to the mesh pad;
      a cushion;
      a perforated covering comprising a front side abutting a forward-facing surface of the mesh pad and a rear side abutting a rear-facing surface of the cushion, the perforated covering enclosing the mesh pad and the cushion, wherein the mesh pad is configured to allow the forced air to flow through the mesh pad to the perforated covering, wherein the perforated covering comprises a plurality of perforations through the front side of the perforated covering, wherein the plurality of perforations are configured to permit a fluid transfer of the forced air through the front side of the perforated covering, wherein the adjustable insert is coupled to the rear side of the perforated covering, wherein the two or more adjustable portions and the center portion each comprise a plurality of holes configured to permit fluid transfer of the forced air through the adjustable insert; wherein the nozzle is configured to first deliver the forced air at a bottom edge of the mesh pad; and wherein the cushion abuts the mesh pad and the rear side of the perforated covering.

10. The aircraft seat of claim 9, wherein the nozzle is formed via three-dimensional (3D) printing.

11. The aircraft seat of claim 9, wherein the nozzle is telescopically coupled to the one or more ventilation ducts of the ventilation system, wherein the adjustable insert is coupled to the backrest portion by one or more tracks.

12. The aircraft seat of claim 9, wherein the one or more ventilation ducts of the ventilation system are fixedly attached to the backrest portion.

13. The aircraft seat of claim 11, wherein the one or more ventilation ducts of the ventilation system are configured to transfer forced air from the ventilation system to the nozzle.

14. The aircraft seat of claim 13, wherein the ventilation system comprises a ventilation system control module.

15. The aircraft seat of claim 11, wherein the ventilated adjustable headrest is configured to be telescopically adjustable along an adjustment axis.

\* \* \* \* \*